United States Patent
Arnold et al.

(10) Patent No.: US 10,171,315 B2
(45) Date of Patent: Jan. 1, 2019

(54) ORCHESTRATION PROCESS TEMPLATE FOR GENERATION OF ORCHESTRATION PROCESS TO TOLERATE ERRORS

(71) Applicant: INTERNATIONAL BUSINESS MACHINES CORPORATION, Armonk, NY (US)

(72) Inventors: Robin C. Arnold, Hampshire (GB); Thomas E. Chefalas, Somers, NY (US); Florian D. Graf, Zurich (CH); Andrzej Kochut, Mount Kisco, NY (US); Naresh Nayar, Rochester, MN (US); Birgit M. Pfitzmann, Wettswil (CH); Mahesh Viswanathan, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 371 days.

(21) Appl. No.: 15/196,602

(22) Filed: Jun. 29, 2016

(65) Prior Publication Data
US 2018/0006904 A1  Jan. 4, 2018

(51) Int. Cl.
*H04L 12/24* (2006.01)
*H04L 29/08* (2006.01)

(52) U.S. Cl.
CPC ........ *H04L 41/5041* (2013.01); *H04L 41/142* (2013.01); *H04L 67/02* (2013.01); *H04L 67/2852* (2013.01)

(58) Field of Classification Search
CPC ... H04L 67/02; H04L 31/5041; H04L 41/142; H04L 67/2852
See application file for complete search history.

(56) References Cited

U.S. PATENT DOCUMENTS

| | | | |
|---|---|---|---|
| 7,545,816 B1 * | 6/2009 | Coutts | G06Q 20/1085 235/375 |
| 10,061,464 B2 * | 8/2018 | Addala | G06F 3/048 |
| 2003/0182427 A1 * | 9/2003 | Halpern | G06F 9/4843 709/226 |

(Continued)

OTHER PUBLICATIONS

Sunita Chacko, Jeff Brent, "Error handling in WebSphere Process Server, Part 1: Developing an error handling strategy" http://www.ibm.com/developerworks/websphere/library/techarticles/0810_chacko/0810_chacko.html Oct. 29, 2008

(Continued)

*Primary Examiner* — Arvin Eskandarnia
(74) *Attorney, Agent, or Firm* — F. Chau & Associates, LLC (57) ABSTRACT

A method to generate an executable orchestration process includes: querying a user to enter first computer code for activating a service; querying the user to enter second computer code for undoing actions performed in the activating; loading pre-defined third computer code for determining whether the activated service is a success or has an error, based on the service; loading pre-defined fourth computer code for correcting the error; generating an executable orchestration function from the first through fourth computer code; and generating the orchestration process from the executable orchestration function.

20 Claims, 8 Drawing Sheets

(56) References Cited

U.S. PATENT DOCUMENTS

| | | | |
|---|---|---|---|
| 2006/0074704 A1* | 4/2006 | Shukla | G06F 8/10 717/104 |
| 2006/0074734 A1* | 4/2006 | Shukla | G06F 8/10 717/107 |
| 2007/0021995 A1* | 1/2007 | Toklu | G06F 8/10 705/7.27 |
| 2010/0082556 A1* | 4/2010 | Srinivasan | G06F 8/72 707/693 |
| 2011/0218842 A1* | 9/2011 | Addala | G06Q 10/06393 705/7.39 |
| 2011/0218925 A1* | 9/2011 | Addala | G06Q 10/103 705/301 |
| 2012/0150693 A1* | 6/2012 | Dueck | G06Q 10/06312 705/26.81 |
| 2013/0275372 A1* | 10/2013 | Giustra | G06F 17/30306 707/609 |
| 2014/0075239 A1* | 3/2014 | Prathipati | H04L 29/14 714/4.1 |

OTHER PUBLICATIONS

"The ExceptionHandler Orchestration" https://msdn.microsoft.com/en-us/library/aa578012.aspx Feb. 25, 2009.

* cited by examiner

ORCHESTRATION PROCESS TEMPLATE FOR GENERATION OF ORCHESTRATION PROCESS TO TOLERATE ERRORS

BACKGROUND

1. Technical Field

The present disclosure relates generally to an orchestration process template, and more particularly to generation of an orchestration process using the template.

2. Discussion of Related Art

An orchestrator is the entity that manages complex cross-domain (e.g., system, enterprise, firewall) processes, and that handles exceptions. The main difference between a workflow "automation" and an "orchestration" (in the context of cloud computing), is that workflows are processed and completed as processes within a single domain for automation purposes, whereas orchestration includes a workflow and provides a directed action towards larger goals and objectives (described through quality of service parameters). Examples of these goals and objectives include meeting application performance using a minimal cost and maximizing application performance within budget constraints. Cloud service orchestration is the composing of the architecture, tools and processes used by humans to deliver a defined service, stitching of software and hardware components together to deliver the defined service, and the connecting and automating of workflows when applicable to deliver the defined service.

The Web Services Business Process Execution Language (WS-BPEL), commonly known as Business Process Execution Language (BPEL) is an OASIS standard executable language for specifying actions within orchestration processes with web services. BPEL is based on the Extensible Markup Language (XML). As an example, BPEL can be used to provide fully managed resources (e.g., virtual machines, bare metal servers, storage devices) in the cloud. A cloud provider offering these services has to rely on a large number of service delivery tools, and as a result has to interact with a large number of sub-systems. However, each of the sub-systems can encounter an error and therefore cause failure of the overall orchestration process.

Current BPEL orchestration engines allow a process engineer to author process definitions that represent a sequence of activities. For example, one of the activities in the sequence could be to check on the status of one of the remote systems, and a second one of the activities of the sequence could be to load the software on the remote system upon receipt of the status being set to ready. Each activity must have an underlying implementation (e.g., a code section of XML) that is hard coded at the authoring stage. However, since the underlying code section for each activity is hard coded, it cannot be easily reused.

BRIEF SUMMARY

According to an exemplary embodiment of the inventive concept, a method is provided to generate an executable orchestration process. The method includes: querying a user to enter first computer code for activating a service; querying the user to enter second computer code for undoing actions performed in the activating; loading pre-defined third computer code for determining whether the activated service is a success or has an error, based on the service; loading pre-defined fourth computer code for correcting the error; generating an executable orchestration function from the first through fourth computer code; and generating the orchestration process from the executable orchestration function.

According to an exemplary embodiment of the inventive concept, a computer system is configured to manage an executable orchestration process. The system includes: a memory storing a computer program; and a processor configured to execute the computer program. The computer program is configured to query a user to enter first computer code for activating a service, query the user to enter second computer code for undoing actions performed in the activating, load pre-defined third computer code for determining whether the activated service is a success or has an error, based on the service, load pre-defined fourth computer code for correcting the error, generate an executable orchestration function from the first through fourth computer code, and generate the orchestration process from the executable orchestration function.

According to an exemplary embodiment of the inventive concept, a computer program product is provided to generate an executable orchestration process. The computer program product includes a computer readable storage medium having program instructions embodied therewith. The program instructions are executable by a computer to perform a method including: querying a user to enter first computer code for activating a service; querying the user to enter second computer code for undoing actions performed in the activating; loading pre-defined third computer code for determining whether the activated service is a success or has an error, based on the service; loading pre-defined fourth computer code for correcting the error; generating an executable orchestration function from the first through fourth computer code; and generating the orchestration process from the executable function.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Examples are the orchestration of a manufacturing process, a process to retrieve or store goods in a wholesale or retail store, a process to analyze a medical sample or set of samples, a process governing a series of chemical reactions, a process to analyze and file incoming paper documents in a financial institution, a process to manufacture a chemical substance, a process to monitor an automobile engine, a process to monitor a chemical reaction, or a process to monitor a medical device.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Figure 1:
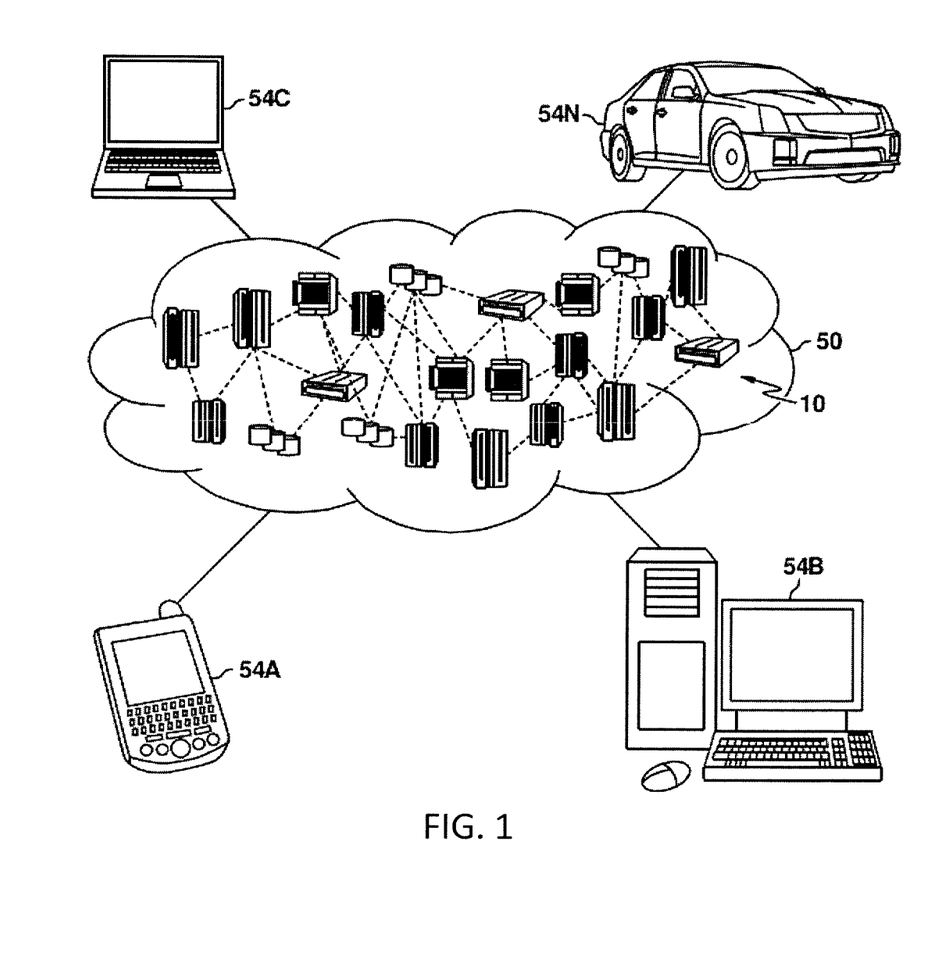
FIG. 1 illustrates a cloud computing environment according to an embodiment of the present invention.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes. Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
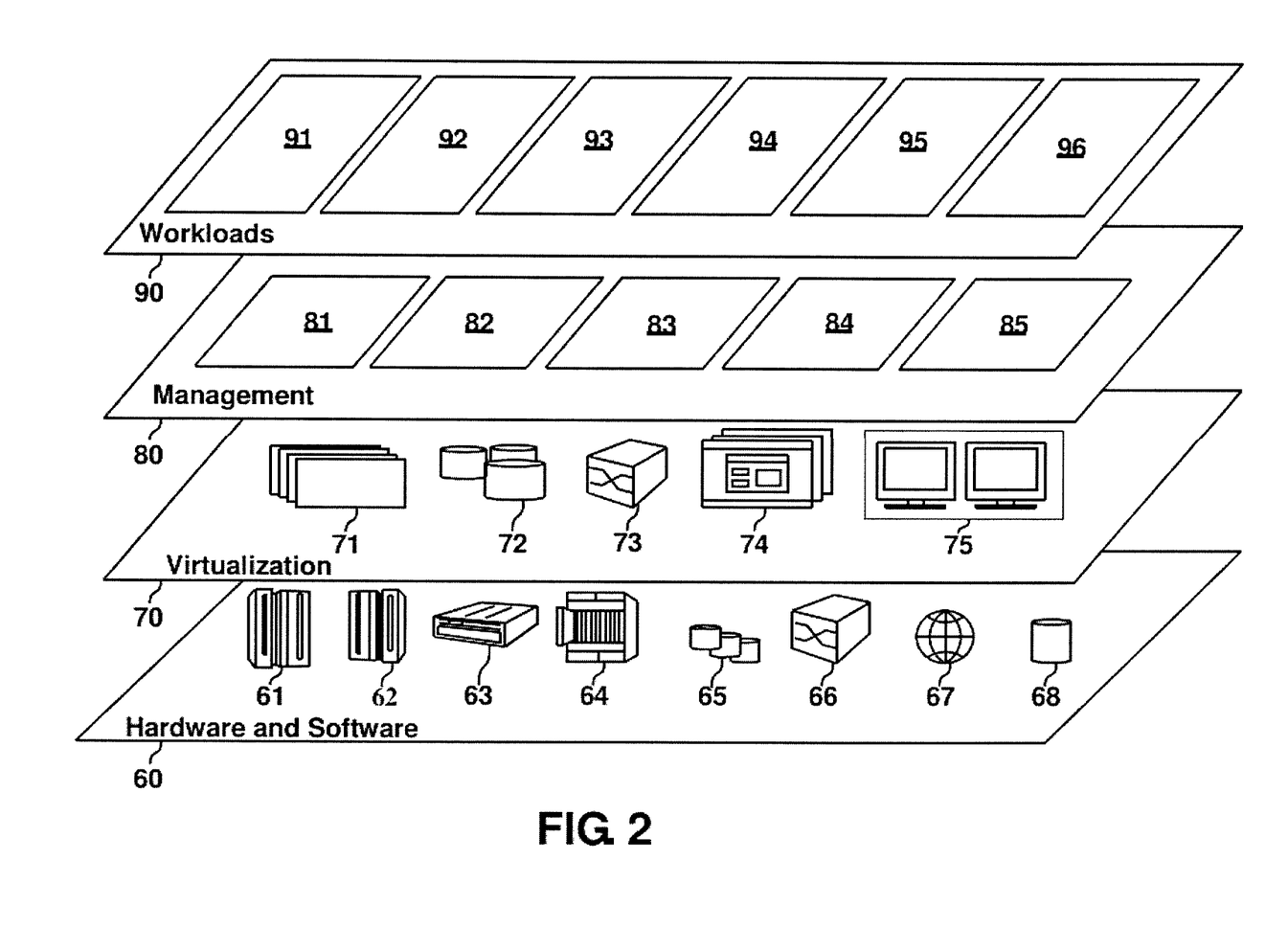
FIG. 2 depicts abstraction model layers according to an embodiment of the present invention, which may be used to implement an orchestration server.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an orchestration server 96 acting as an orchestrator. The orchestration server 96 will be discussed in more detail below.

Figure 3:
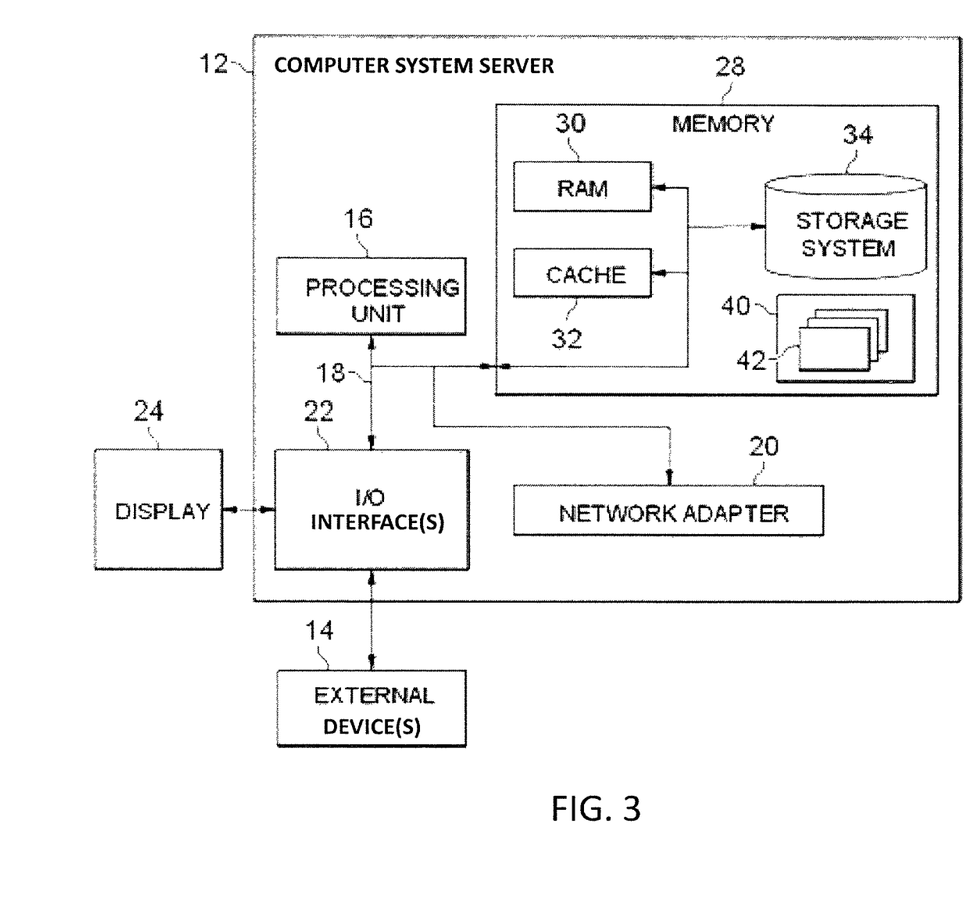
FIG. 3 shows an exemplary computer system which may be used to implement the orchestration server.

FIG. 3 illustrates an embodiment of a computer server that may be used to implement part of computing devices 54A-54N, or the orchestration server 96, which is applicable to implementing embodiments of the present invention. Computer system/server 12 is only illustrative and is not intended to suggest any limitation as to the scope of use or functionality of embodiments of the invention described herein.

As shown in FIG. 3, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures.

By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

The orchestration server 96 may execute an orchestration process including activity functions for providing a provisioning service, a monitoring service, a patch service, a compliance service, a virtual machine service, bare metal server service, data storage service. Examples of the provisioning service include network, server, user, self-service, mobile subscriber, mobile content, and Internet access provisioning. Examples of the monitoring service include website monitoring, network monitoring, cloud monitoring, server monitoring, and application monitoring. The patch service can be used automate delivery of software patches to remote computer systems. The compliance services can be used to determine whether software on a computer system is in compliance with various rules and regulations.

The executable code run by the orchestration server 96 and written to interact with a given service may need to interact with various sub-systems in a particular sequence. However, it can be difficult to write the code so that it is tolerant of failures that occur in these interactions.

Figure 4:
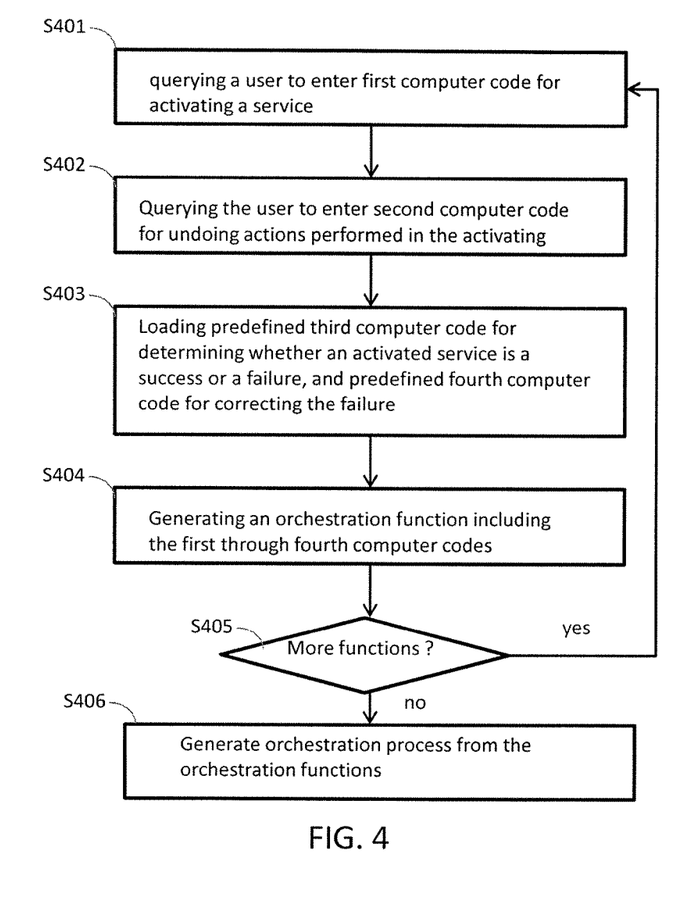
FIG. 4 shows a method of generating an orchestration process according to an exemplary embodiment of the inventive concept.

FIG. 4 illustrates a method of generating a function of an orchestration process according to an exemplary embodiment of the inventive concept. The method includes: querying a user to enter first computer code for activating a service (S401); querying the user to enter second computer code for undoing actions performed in the activating of the service (S402); loading third computer code predefined for determining whether an activated service is a success or a failure and fourth computer code predefined for correcting the failure (S403); generating an orchestration function including the first through fourth computer code (S404); and determining whether an additional orchestration function is needed (S405). If the additional orchestration process is needed, step S401-S404 are executed. If the additional orchestration process is not needed, then an orchestration process is generated from the previously entered orchestration functions (S406). Since the method enables several orchestration functions to be generated, different types of services may be provided within a single orchestration process.

The first computer code is hereafter referred to as "Do Work" code 501, the second computer code is hereafter referred to as "Undo Work" code 502, the third computer code is hereafter referred to as "Error Check" code 503, and the fourth computer code is hereafter referred to as "Correct" code 504. In an embodiment, the "Do Work" code 501 and the "Undo Work" code 502 are JAVA code, the "Error Check" code 503 and the "Correct Code" 504 are BPEL code, and the orchestration process is a BPEL program.

The "Error Check" code 503 and the "Correct" code 504 maybe referred to as an orchestration process template that can be loaded from storage 34 and re-used by other developers also interested in activating a given similar service. The "Error Check" code 503 and the "Correct" code 504 loaded for one service type (e.g., monitoring) may be different for a different service type (e.g., provisioning). For example, activating a monitoring service could load an orchestration process template suitable for monitoring, whereas activating a virtual machine provisioning service could load an orchestration process template suitable for virtual machine provisioning. In an exemplary embodiment, the system enables a user to replace the pre-defined Error Check code 503 and/or the pre-defined Correct code 504 with code provided by the user.

Figure 5:
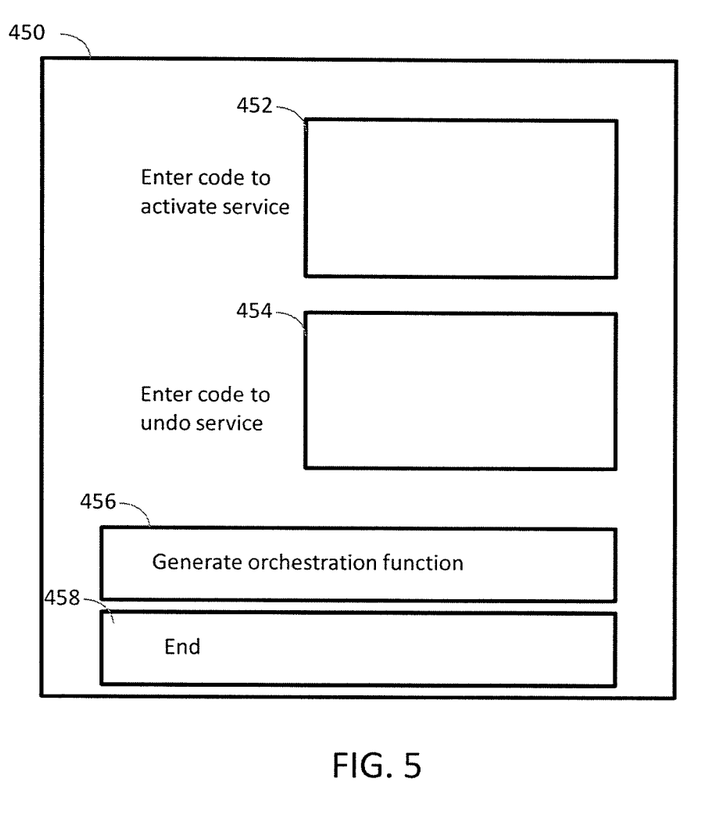
FIG. 5 illustrates an example of a graphical user interface that could be used by the process.

FIG. 5 illustrates an example of a graphical user interface (GUI) that could be presented on display 24 to enable a user to enter the "Do Work" code 501 and the "Undo Work" code 502 to generate one or more orchestration functions and the orchestration process including the orchestration functions. The GUI 450 includes a first text field 452 that enables a user to enter the "Do Work" code 501, a second text field 454 that enables the user to enter the "Undo Work" code 502, a first button 456 that when pressed, loads the corresponding orchestration process template (e.g., codes 503 and 504) and generates a orchestration function from the entered codes and the loaded orchestration process template. Additional orchestration functions can be created using fields 452, 452, and button 456. After the last orchestration functions have been generated, the End button 458 can be selected to generate the final orchestration process using the previous entered orchestration functions. The GUI 450 may include a list that shows the currently entered orchestration function and the order in which they are to be executed in the orchestration process. The list may be used to delete or re-order one or more of the orchestration functions (e.g., change execution order within process). The GUI 450 may present editable fields that display the pre-defined codes 503 and 504 that enable the user to make changes to the pre-defined codes 503 or 504, or replace one or more of them with entirely different code. Many other forms of querying the user are possible according to the state of the art of input systems. For example, the user may be enabled to select a command to enter the code from a menu, or to types it into a command-line interface.

If the "Do Work" code 501 or the "Undo Work" code 502 was previously generated, the GUI 450 may include a mechanism that enables a user to select them from a list of available codes rather than require the user to re-enter them via the provided text fields. Further, the GUI 450 may include additional buttons that enable the user to error check the entered codes to ensure the entered codes can be compiled along with the template into the orchestration process. This error checking may be performed after selection of the buttons 456 or 458. The GUI 450 may include a field for presenting errors to the user if an orchestration function or the orchestration process could not be generated (e.g., due to an error in the entered codes or an incompatibility with the template). This enables a user to correct the entered codes and attempt to re-generate the orchestration function or process.

Figure 6:
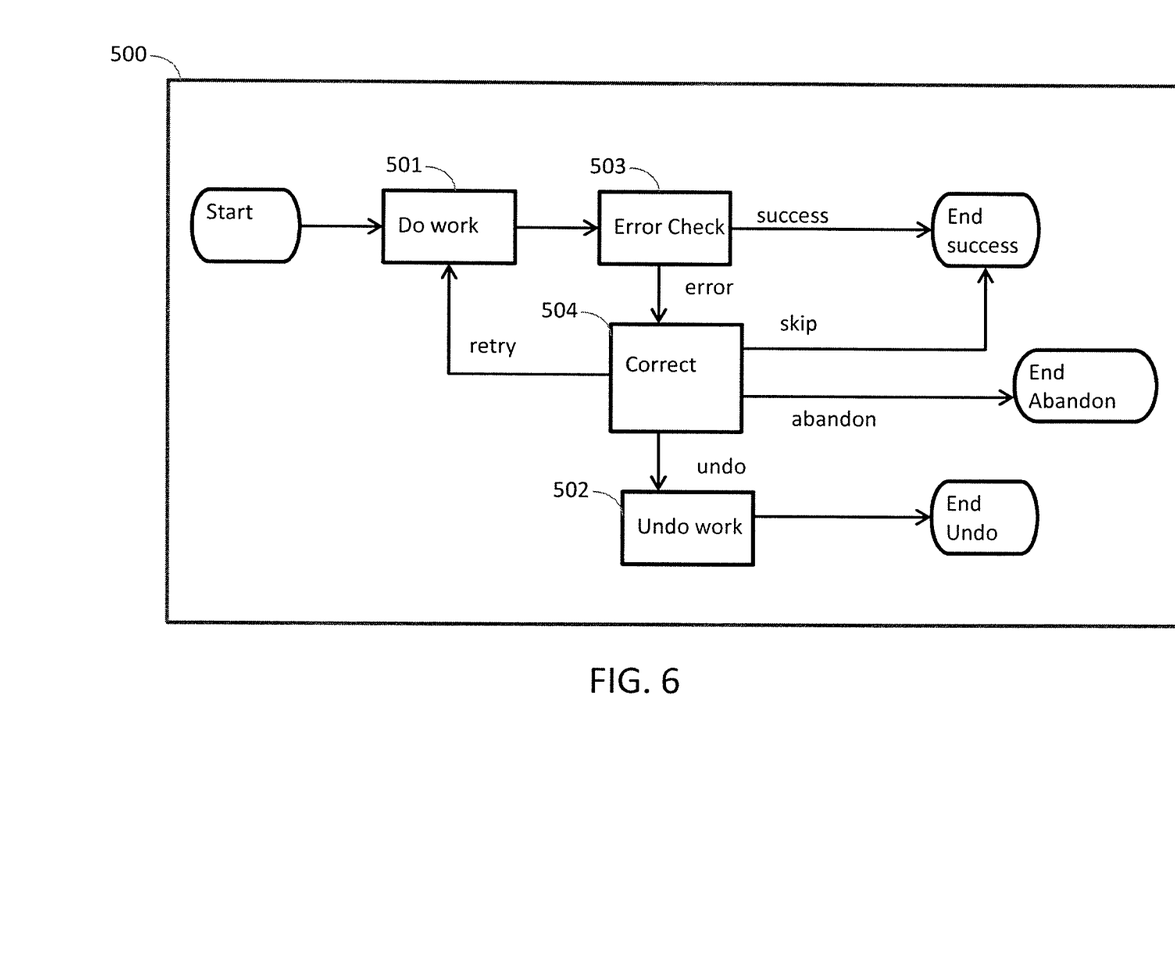
FIG. 6 illustrates an orchestration process that may be generated by the method according to an exemplary embodiment of the inventive concept.

FIG. 6 illustrates an example of an orchestration function 500 generated from the entered "Do Work" code 501 and "Undo Work" code 502 and the pre-defined "Error Check" code 503 and the "Correct" code 504. In this embodiment, the generating of the orchestration function 500 includes configuring the function to provide an output of the "Do Work" code 501 to the "Error Check" code 503, configuring the function to provide an output of the "Error Check" code 503 to the "Correct" code 504, and configuring the function to provide an output of the "Correct" code 504 to the "Undo Work" code 502.

Examples of the services that can be activated by the "Do Work" code 501 include monitoring one or more local or remote computers or applications, provisioning one or more virtual machines, bare metal servers, or storage devices, patching of software, backup, security validation, patching, software installation, software updating, configuration management, asset management, user access management, license management, disaster recovery enablement, and compliance management. Examples also include stopping a service, decommissioning a service or an entire server, replacing a service (e.g., one monitoring service by another), or reconfiguring it (e.g., setting a longer retention period for backups than before). For example, in providing these services, the "Do Work" code 501 may need to interact with provisioning and lifecycle providers as VMware vSphere for virtual machines, IBM xCat for bare metal servers, or IBM Storage Virtualization Manager (SVM) for storage management. For example, in providing these services, the first computer code 501 may need to interact with a Tivoli Endpoint Manager (TEM) for patching, a Tivoli Storage Manager (TSM) for backup, a Symantec Endpoint protection server for security validation, and similar products for the other respective functions. It may also need to interact with a configuration management database (CMDB) for obtaining further information about the configuration item where the services is to be activated, and for entering its results.

In the below example, it is assumed that the "Do Work" code 501 has been written to monitor two different applications, running on two different servers over a computer network such as the Internet. For example, the monitoring of the applications may require that the "Do Work" code 501 install different agent programs on each of the two servers, e.g., because they have different operating systems.

In an exemplary embodiment, the "Do Work" code 501 outputs information indicating whether it encountered an error, which may include the error severity or detail about the type of error (e.g., unable to monitor a particular application, unable to provision a virtual machine on a particular sever, etc.). For example, if the "Do Work" code 501 has failed to install the second agent program on the second server, the "Error Check" code 503 can use the output of the "Do Work" code 501 to determine that the second agent program was not installed.

In an exemplary embodiment, the "Do Work" code 501 writes the results of the actions it performs into a log file that is accessible by the "Error Check" code 503. For example, it is assumed that the log file includes entries identifying the actions performed and whether they were successful. For example, the log file could include a first entry that identifies the first agent program, its first destination server (e.g., its IP address, host name, etc.), and an indicator indicating its installation was a success, and a second entry that identifies the second agent program, its second destination server (e.g., its IP address, host name, etc.), and an indicator that indicates its installation was a failure. In this example, the "Error Check" code 503 checks the log file and determines that the second agent program was not installed on the second destination server.

The "Error Check" code 503 then provides error information to the "Correct" code 504 indicating that the second agent program could not be installed on the second destination server.

The "Correct" code 504 then performs an action that is designed to make it possible for the "Do Work" code 501 to install the second agent program. For example, the "Correct" code 504 could automatically reboot the second destination server, change a file permission of a directory of the second destination server to writable and/or executable if its current permission state is preventing the upload of the second agent program, free up space (e.g., delete unused files) on the second destination server to enable the second agent program to fit on the second destination server, or perform some other action that enables the second destination server to receive the second agent program. Next, the "Correct" code 504 re-executes (e.g., see retry arrow in FIG. 6) the "Do Work" code 501 after it has performed one of the above described actions. It is presumed in this example that the "Do Work" code 501 is aware that it was unable install the second agent program (e.g., by inspecting the log file, or because it has remained in memory in its state from the prior execution) the last time it was executed and attempts to only install the second agent program on the second destination server. If the "Error Check" computer code 503 then determines that all of the monitoring agents have been properly installed, the orchestration function 500 ends in a success.

However, if the "Error Check" code 503 determines that all of the monitoring agents still have not been installed and the "Correct" code 504 has already been invoked a predefined number of times (e.g., re-tries), then the "Correct" code 504 is designed to either undo the actions performed by the "Do Work" code 501 or abandon the effort to install the second monitoring agent (i.e., leave the first monitoring agent installed). For example, the "Correct" code 504 may be designed with various conditions that are used to determine whether to undo or abandon. For example, if it is assumed that this condition requires that all monitoring agent programs being installed, then the "Correct" code 504 could invoke the "Undo" code 502 to undo the actions of the "Do Work" code 501 such as deleting the first agent program from the first destination server. However, if the condition only requires that a certain number of re-tries be performed, then the "Correct" code 504 can abandon its attempts, which would leave the first agent on the first destination server. In an exemplary embodiment, the "Correct" code 504 is configured to accept user feedback that enables the "Correct" code 504 to skip correction attempts and treat the encounter as a success. For example, the display 24 may present a notification to a user of the failure to install the second agent and a prompt that enables the user to skip further correction attempts. For example, the user may have already manually loaded (after or before the notification) the second agent program on the second destination server, and thus there is no need to continue executing the orchestration function 500. The user feedback may also be provided to the "Correct" code 504 as an external interrupt, e.g., if the "Do work" code 501 takes very long and the user gets impatient before getting a notification. The "Correct" code 504 may be configured to inform the user of the status, e.g., whether errors were already seen and retries performed.

As discussed above, an orchestration process may include a sequence of different orchestration functions 500. Each orchestration function returns one of three outcomes: "Success", "Abandon", or "Undo". As discussed above, the Undo implements required logic to roll-back the changes caused by the function. If a current function in the process returns a Success, the next function in the orchestration process is started. If the current function returns an Undo, the corresponding "Undo work" code 502 has been executed, and also Undo activities for previous functions of the orchestration process are now executed. For example, if it is assumed that an orchestration process included a first orchestration function to provision virtual machines and a second orchestration function to monitor applications on provisioned virtual machines, the first orchestration function successfully provisioned all the virtual machines, but the second orchestration function was unable to enable monitoring on the provisioned virtual machines, the orchestration process would call the undo computer code of not only the second orchestration function, but also the undo computer code of the first orchestration function. If all of the undo operations complete successfully, the orchestration process terminates with an undo status, and the state of all the sub-systems is returned to a globally consistent state. If one of the undo activities fails, the orchestration process ends in an "Abandon" status. However, all of the remaining undo activities may be executed to minimize state inconsistency. The orchestration process may also be a more complex workflow than a sequence of actions. For example, the orchestration process may contain decision points and parallel tasks. Then it may either treat a status "undo" or "abandon" from an individual orchestration function as before (i.e., undo all work done so far in the "undo" case, and continue in the "abandon" case) or take more complex decisions, e.g., branch to the installation of a different monitoring agent if the installation of a first monitoring agent failed with "undo" output, i.e., proper cleanup of that attempt.

Figure 7:
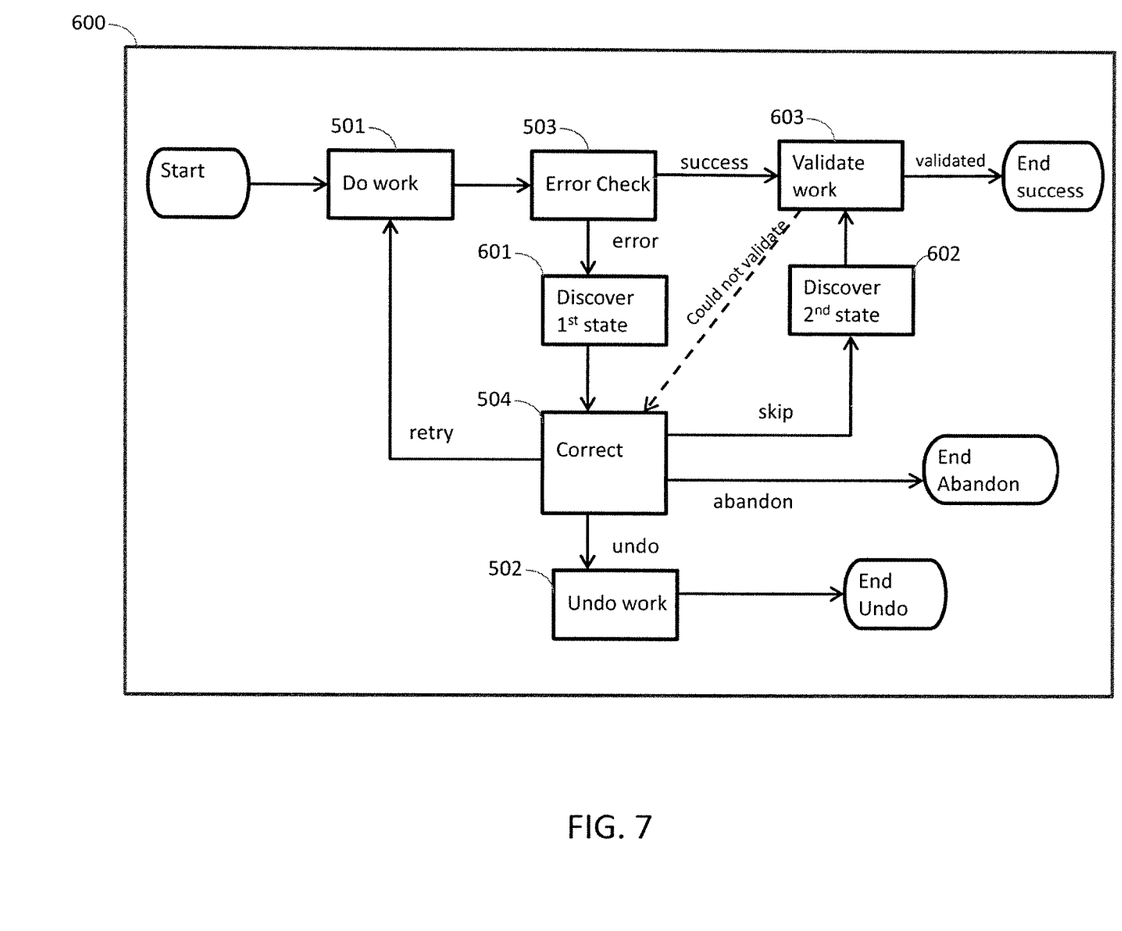
FIG. 7 illustrates another orchestration process that may be generated by the method according to an exemplary embodiment of the inventive concept.

FIG. 7 illustrates embodiment on the orchestration function 500 depicted in FIG. 6. In this embodiment, the GUI 450 expects the user to enter first state discovery code 601, second state discovery code 602, and "Validate Work" code 603 for validating the activated service.

For example, the fifth code 601 may be configured to discover the type of error that "Error Check" code 503 is reporting. For example, when the "Error Check" code 503 indicates that an error has occurred, the first state discovery code 601 is configured to determine more specifically the type of error that occurred and the address of the server affected by the error. For example, if the error indicates that an error in activation of a monitoring application occurred, the first state discovery code 601 can compare the previous states of the network addressable servers with their current states to determine whether a condition exists on the servers that would prevent a monitoring application from being activated on a respective one of the servers. It may also discover the network reachability and status of the central monitoring server. The first state discovery code 601 can then provide this state information to the "Correct" code 504 so it can apply an appropriate action to the corresponding server.

In an embodiment, the "Correct" code 504 creates an incident ticket based on the error and assigns a user (e.g., an administrator) to resolve the error or attempts to automatically resolve the error (e.g., automatically reboots a given server, frees space on a given server, changes file or directly permissions on a given server, etc.). As the resolution process is on-going, the orchestration function 600 remains on hold awaiting the resolution. Upon incident ticket closure, the administrator or the "Correct" code 504 in the function 600 itself indicates the outcome and decides on the next step. Valid next steps include a "RETRY", which either retries the "Do Work" code 501 (e.g., external error condition has been corrected), a "SKIP", which ends with a success after discovering state changes performed by the administrator, an "Undo" indicating the function should be ended with an undo, or an "Abandon" indicating the function should be ended without an undo.

The second state discovery code 602 can discover information that is used by the "Validate Work" code 603 to validate the activated service. For example, if only part of the service was actually activated due to the skipping, the second state discovery code 602 can provide this information to the "Validate Work" code 603 so it only attempts to validate the non-skipped portion. The "Validate work" code 603 is designed to validate the activated service. For example, if the "Do Work" code 601 is designed to activate application monitoring by installing agent programs, then the "Validate Work" code 603 may be configured to communicate with the agent programs to retrieve monitoring data, or with the central monitoring server to see if the agents are known as active there and have provided monitoring data to it. For example, if the "Validate Work" code 603 is able to retrieve monitoring data from each of the agent programs, it can validate that the activated service is performing properly. If the "Validate Work" code 603 is not able retrieve the monitoring data, in an exemplary embodiment, it provides this information to the "Correct" code 504, which attempts to correct the problem.

In an exemplary embodiment, entry of the "Do Work" code 501 and the "Undo Work" code 502 causes an orchestration function (e.g., 500 or 600) to include routines to collect execution statistics. For example, a collection statistics routine may be invoked after the "Correct" code 504 to determine how often the "Correct" code 504 ends with each of its four possible outcomes. In another example, a collection statistics routine is included between the "Do Work" code 501 and the "Error Check" code 503 and provides execution statistics on the "Do Work" code 501. In a further example, the collection statistics routine is included after the "Validate Work" 603 code to collect statistics on the execution of the "Validate Work" 603 code.

Figure 8:
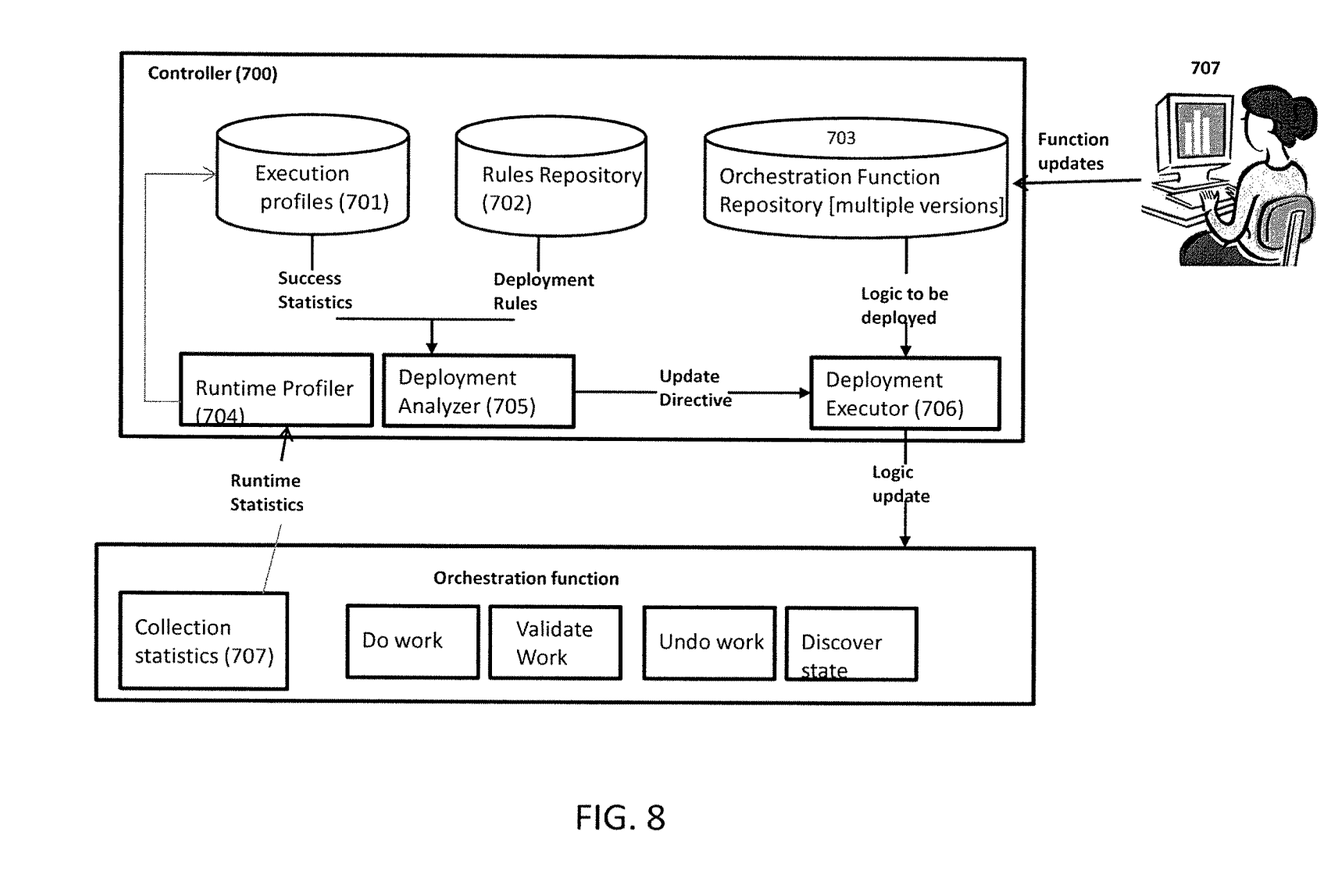
FIG. 8 illustrates a system according to an exemplary embodiment of the inventive concept.

FIG. 8 illustrates a controller 700 according to an exemplary embodiment of the invention that is used by a user 707 to update and profile orchestration functions (e.g., 500 or 600). For example, user 707 updates a given orchestration function and can store multiple versions of the orchestration function in the Orchestration Function repository 703. The Deployment Executor 706 can then choose one version of the Orchestration Function to deploy in an Orchestration Process on the Orchestration server 96 based on an update directive received from a Deployment Analyzer 705. The deployed orchestration function can provide statistics to a runtime profiler 704 of the controller 700. The runtime profiler 704 can store these statistics in an execution profile database 701 of the controller 700. A deployment analyzer 705 of the controller 700 can analyze the stored execution profiles based on deployment rules provided in a Rules repository 702 of the controller 700 to determine which version of the Orchestration function to deploy. The "Do work" code 501 implements an action to be performed and the "undo work" code 502 implements steps to return the system to an initial state. The "Validate work" code 603 confirms the validity of the action (if the system state is as desired) and the "Discover state" code 601 and 602 gathers state information required as output of the function (e.g., when the function was completed by administrator). The collection statistics routine 707 collects detailed run-time statistics for the function and provides these to developers. Success rates as well as detailed discovered system states may be traced. Statistical analysis of the data is performed to reveal failure rates (and also system state conditions at failure point). The Deployment analyzer 705 uses activity execution profiles and deployment rules to optimize runtime and development. The Controller 700 can autonomously change the deployed version of the function based on failure rates (optionally disable function and resort to manual mode). This enables developers to focus on the most faulty and impactful functions and to raise operational alarms as needed.

The Deployment Executor 706 manages deployed activities in reaction to deployment analyzer 705 directives. New versions of the orchestration function are deployed as required by the Deployment analyzer 705. In an embodiment, the Deployment Executor 706 is configured to change a parameter of the Orchestration function. For example, when the "Correct" code 504 re-tries executing the "Do Work" code 501 a variable number of times, this variable may be set to a new value by the Deployment Executor 706. For example, the "Correct" code 504 may be configured to except an inter-process message from the Deployment analyzer 705 that sets a value of a variable indicating how often re-tries are to be performed. For example, if the Orchestration function is currently deployed such that the "Correct" code 504 re-tries 3 times, the Deployment Executor 706 could send an inter-process message to the "Correct" code 504 setting the variable to 4.

In an embodiment, rather than the "Correct" code 504 retrying execution of the "Do Work" code 501 immediately, it defers the retry until a later time. For example, if second other orchestration function to be subsequently run is not dependent on the full activation of a given service due to the first current orchestration function, the retrying to activate the remaining portions can be deferred so that the second orchestration function is executed next. Then after the second orchestration function has executed, the "Do Work" code 501 of the first orchestration function can be re-executed (re-tried). For example, temporary problems like network congestion or server reboots may have disappeared in the meantime.

In an embodiment, when the error determined by the "Error Check" 503 is not considered severe, the "Error Check" 503 could send a different type of output (e.g., Continue and propagate the error) that enables the function to continue.

In an exemplary embodiment, a timer is started when the "Do Work" code 501 is invoked. If the timer reaches a certain timeout time while the "Do Work" code 501 is still running (e.g., it is stuck), the function immediately switches to the "Correct" code 504 with or without killing the "Do Work" 501 code.

An orchestration process according to an embodiment of the inventive concept can undo all the work accomplished prior to the error. Even if an undo encounters an error, the overall undo process continues, but the orchestration process completes with an indication that resources have been abandoned. The structure of the orchestration function enables a decoupling of the logic components from the overall orchestration process. At least one embodiment of the inventive concept provides a structured submission of an incident ticket (including system state). As the incident ticket is being resolved, the orchestration process waits for closure, preserving the execution state. Incident ticket resolution can include direct system state change by a human or an external entity. Hence, the state changes are discovered after the closure of the incident ticket. Further, embodiments of the inventive concept provide runtime profiling of process activities (e.g., failure rates and system state conditions) and policy-based analytics to decide on version to be deployed so development efforts can be prioritized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method to generate an executable orchestration process, the method comprising:
   querying a user to enter first computer code for activating a service;
   querying the user to enter second computer code for undoing actions performed in the activating;
   loading pre-defined third computer code for determining whether the activated service is a success or has an error, based on the service;
   loading pre-defined fourth computer code for correcting the error;
   generating an executable orchestration function from the first through fourth computer code; and
   generating the orchestration process from the executable orchestration function.

2. The method of claim 1, wherein the third and fourth computer codes are in a Business Process Execution Language (BPEL) format.

3. The method of claim 2, wherein the first and second computer codes are in a Java format.

4. The method of claim 1, wherein the service is one of a resource provisioning service, a monitoring service, patching service, and a compliance management service.

5. The method claim 4, wherein the resource provisioning service provisions one of a virtual machine, a bare metal server, a software program, and a data storage area.

6. The method of claim 4, wherein the monitoring service is one of website monitoring, network monitoring, cloud monitoring, server monitoring, and application monitoring.

7. The method of claim 1, wherein the fourth computer code is configured to automatically perform an action to a server that is to be part of the service when the activated service has the error, and then execute the first computer code.

8. The method of claim 1, wherein the fourth computer code is configured to execute the second computer code after the first computer code has executed the first computer code more than a threshold number of times.

9. The method of claim 1, wherein the fourth computer code is configured to indicate the service has been successfully activated.

10. The method of claim 1, wherein the first computer code includes a plurality of actions and the fourth computer code is configured to exit without executing the second computer code when at least a certain number of the actions have been performed successfully.

11. The method of claim 1, wherein prior to generating orchestration process, the method includes querying the user for fifth computer code to validate the activated service, and orchestration additionally includes the fifth computer code.

12. A computer system configured to manage an executable orchestration process, the system comprising:
    a memory storing a computer program; and
    a processor configured to execute the computer program, wherein the computer program is configured to query a user to enter first computer code for activating a service, query the user to enter second computer code for undoing actions performed in the activating, load pre-defined third computer code for determining whether the activated service is a success or has an error, based on the service, load pre-defined fourth computer code for correcting the error, generate an executable orchestration function from the first through fourth computer code, and generate the orchestration process from the executable orchestration function.

13. The computer system of claim 12, further comprising a controller configured to execute the orchestration process and store the orchestration process.

14. The computer system of claim 13, wherein the controller is configured to profile the orchestration process while the orchestration process is executing to generate and store a runtime profile.

15. The computer system of claim 13, wherein the controller is configured to change a part of the orchestration process based on how the runtime profile compares to a predefined rule.

16. The computer system of claim 15, wherein the change comprises the controller sending an inter-process communication to the orchestration process indicating that a value of a parameter of the orchestration process is to change.

17. The computer system of claim 12, wherein the service is one of a resource provisioning service, a monitoring service, patching service, and a compliance management service.

18. The computer system of claim 12, wherein the third and fourth computer codes are in a Business Process Execution Language (BPEL) format.

19. A computer program product to generate an executable orchestration process, the computer program product comprising a computer readable storage medium having program instructions embodied therewith, the program instructions executable by a computer to perform a method comprising:

querying a user to enter first computer code for activating a service;

querying the user to enter second computer code for undoing actions performed in the activating;

loading pre-defined third computer code for determining whether the activated service is a success or has an error, based on the service;

loading pre-defined fourth computer code for correcting the error;

generating an executable orchestration function from the first through fourth computer code; and     generating the orchestration process from the executable function.

20. The computer program product of claim 18, wherein the service is one of a resource provisioning service, a monitoring service, patching service, and a compliance management service.

\* \* \* \* \*